United States Patent
Kim et al.

(10) Patent No.: US 7,840,221 B1
(45) Date of Patent: Nov. 23, 2010

(54) WLAN HAVING LOAD BALANCING BY BEACON POWER ADJUSTMENTS

(75) Inventors: Byoung-Jo J. Kim, Jersey City, NJ (US); Zoran Kostic, Holmdel, NJ (US); Hujun Yin, Whitehall, PA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1349 days.

(21) Appl. No.: 10/261,295

(22) Filed: Sep. 30, 2002

Related U.S. Application Data

(60) Provisional application No. 60/332,959, filed on Nov. 19, 2001.

(51) Int. Cl.
*H04W 72/00* (2009.01)

(52) U.S. Cl. ............. 455/453; 455/450; 455/434; 455/422.1

(58) Field of Classification Search ............ 455/524, 455/525, 62, 515, 513, 456.1, 522, 517, 463, 455/500, 442, 436, 434, 453, 450, 422.1; 370/338, 395.21
See application file for complete search history.

(56) References Cited

U.S. PATENT DOCUMENTS

| | | | |
|---|---|---|---|
| 5,513,210 A | 4/1996 | Vook et al. | |
| 5,594,731 A | 1/1997 | Reissner | |
| 5,654,959 A * | 8/1997 | Baker et al. | 370/331 |
| 5,812,531 A | 9/1998 | Cheung et al. | |
| 5,844,900 A | 12/1998 | Hong et al. | |
| 5,901,362 A | 5/1999 | Cheung et al. | |
| 5,933,420 A * | 8/1999 | Jaszewski et al. | 370/329 |
| 6,002,918 A * | 12/1999 | Heiman et al. | 340/7.38 |
| 6,067,297 A | 5/2000 | Beach | |
| 6,324,403 B1 * | 11/2001 | Jalloul | 455/453 |
| 6,374,311 B1 | 4/2002 | Mahany et al. | |
| 6,522,888 B1 * | 2/2003 | Garceran et al. | 455/456.3 |
| 6,614,771 B1 * | 9/2003 | Kim et al. | 370/335 |
| 6,799,054 B2 * | 9/2004 | Shpak | 455/525 |
| 6,859,654 B1 * | 2/2005 | Reynolds et al. | 455/437 |
| 2001/0005359 A1 * | 6/2001 | Bergqvist | 370/230 |
| 2002/0045424 A1 | 4/2002 | Lee | |
| 2002/0110105 A1 * | 8/2002 | Awater et al. | 370/338 |
| 2002/0131386 A1 * | 9/2002 | Gwon | 370/338 |
| 2003/0003933 A1 * | 1/2003 | Deshpande et al. | 455/510 |
| 2003/0060224 A1 * | 3/2003 | Nelson et al. | 455/522 |
| 2003/0081583 A1 * | 5/2003 | Kowalski | 370/338 |
| 2003/0087646 A1 * | 5/2003 | Funato et al. | 455/456 |
| 2003/0146835 A1 * | 8/2003 | Carter | 340/539.13 |
| 2004/0242257 A1 * | 12/2004 | Valkealahti et al. | 455/522 |
| 2005/0048937 A1 * | 3/2005 | Sarkar et al. | 455/127.2 |

FOREIGN PATENT DOCUMENTS

| | | |
|---|---|---|
| EP | 1133208 A2 | 9/2001 |
| EP | 1133208 A2 * | 9/2001 |
| EP | 1156623 A1 | 11/2001 |
| EP | 1178630 A1 | 2/2002 |
| EP | 1206070 A2 | 5/2002 |
| EP | 1207452 A2 | 5/2002 |
| WO | WO 98/35453 A1 | 8/1998 |
| WO | WO 02/13429 A1 | 2/2002 |

* cited by examiner

*Primary Examiner*—Ajit Patel
*Assistant Examiner*—Khai M Nguyen

(57) ABSTRACT

A network includes access points that can reduce beacon power to redistribute mobile station loading on the access points. A relatively highly loaded access point can reduce its beacon power so that one or more connected mobile stations will migrate to a further access point covering the migrating mobile station.

9 Claims, 3 Drawing Sheets ns to migrate to other access points if possible. In an exemplary embodiment, mobile stations scan frequency channels to obtain access point beacon signal information, which can be sent to and stored by an associated access point. The access point can evaluate whether an associated mobile station can successfully migrate to another access point if the beacon power for the current access point is reduced.

WLAN HAVING LOAD BALANCING BY BEACON POWER ADJUSTMENTS

CROSS REFERENCE TO RELATED APPLICATIONS

The present invention claims the benefit of U.S. Provisional Patent Application No. 60/332,959, filed on Nov. 19, 2001, which is incorporated herein by reference.

STATEMENT REGARDING FEDERALLY SPONSORED RESEARCH

Not Applicable.

FIELD OF THE INVENTION

The present invention relates generally to communication networks and, more particularly, to wireless communication networks.

BACKGROUND OF THE INVENTION

Wireless communication networks for providing links to mobile stations are well known in the art. In one type of wireless network, a series of access points provide wireless connections to various mobile users. For example, a building can include access points located at strategic locations to serve mobile users as they move throughout the building. The mobile users migrate from access point to access point based upon the strength of beacon signals from the various access points. That is, the mobile stations use the strength of the beacon signals to select the best access point at a given point in time.

With changes in the channel environment and number of users in a Wireless Local Area Network (WLAN) system, different access points experience different loading. That is, the number of users served by each of the access points varies over time. Those access points that serve a relatively high number of stations (hot spots) can become overloaded and experience reduced performance. For example, an access point can become overloaded during a meeting in a conference room proximate the access point when the attendees attempt to connect their laptops to the corporate intranet.

It would, therefore, be desirable to adjust the loading of network access points to reduce network congestion.

SUMMARY OF THE INVENTION

The present invention provides a wireless network having access point beacon power adjustment to manipulate access point loading for reducing congestion. With this arrangement, overall network performance is enhanced by more efficient access point loading. While the invention is primarily shown and described in conjunction with wireless access points having beacons, it is understood that the invention is applicable to wireless networks in general in which it is desirable to distribute loading.

In one aspect of the invention, a wireless network includes a series of access points to which mobile stations can associate. In the case where an access point becomes overloaded, the access point can determine whether a beacon power adjustment would offload one or more associated mobile stations to other access points to reduce congestion. In one embodiment, this loading redistribution can be achieved without modifications to conventional mobile stations, since a weak beacon power typically prompts known mobile sta-

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
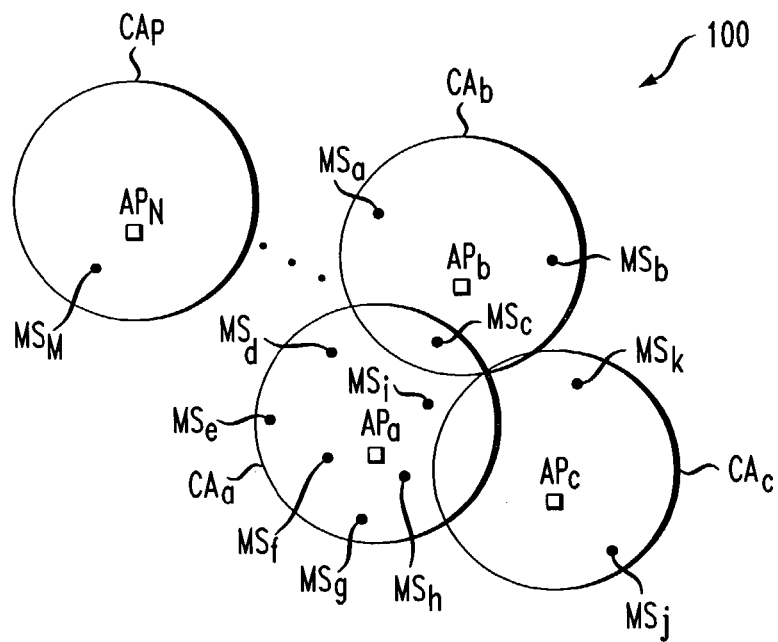
FIG. 1 is a schematic depiction of a wireless network having beacon power adjustment in accordance with the present invention.

FIG. 1 shows an exemplary wireless network 100 having load balancing based upon access point beacon power adjustment in accordance with the present invention. The network includes a series of access points APa-N having associated coverage areas CAa-P serving various mobile stations MSa-M. In general, the beacon power for a given access point AP is adjusted, e.g., reduced, to offload mobile stations to a different access point. For example, a relatively highly loaded access point, here shown as APa, can reduce its beacon power so that one or more mobile stations, such as MSc, no longer receives, or barely receives, the current access point APa beacon signal. This mobile station MSc then looks for another access point, e.g., APb, to which an association or connection can be made, as described in detail below.

In one embodiment, the access points AP receive information from the mobile stations MS indicating how many access points each mobile station can hear. Additional information can include signal strength measurement of those mobile stations that can only hear the current access point. If an access point AP determines that it is overloaded, and that by reducing its beacon power no currently associated mobile station MS would be left without connection to at least one other access point, the access point reduces its beacon power to effect the mobile station load redistribution.

When the power of the beacon signal is reduced, the range within which mobile stations MS will consider this access point AP for association is reduced. As a consequence, the number of mobile stations MS that will communicate with the reduced beacon power access point AP is reduced and its load is concomitantly reduced. An increase of the beacon power can provide the opposite effect, i.e., loading for that access point can increase as more mobile stations connect with this access point.

It is understood that the parameters used to determine whether to modify the beacon power for an access point can vary. Exemplary parameters include loading of the access point (number of associated stations), total traffic intensity through the access point, reports from individual stations, and the measurement of the received signal power from a subset of stations.

It is further understood that the term "mobile station," as used herein, should be construed broadly to include various wireless devices, such as laptops, Personal Digital Assistants (PDAs), mobile phones, and the like. Similarly, the term "access point" should be broadly construed to include transmitters/receivers in general that can provide a radio link with a mobile station.

Before describing further details of the present invention, some basic concepts are now described. In conventional wireless networks having mobile stations served by various access points, such as in a 802.11 network, there is a standard procedure by which mobile stations associate themselves with an access point. Before a mobile station associates with an access point, it obtains information of nearby access points by scanning the frequency channels for their beacons. The access points typically send out beacon frames periodically.

In traditional WLANs, such as 802.11 networks, beacon powers of access points are kept at a fixed level. The mobile station simply chooses the access point with the best signal strength for association. However, it is possible that one access point may be already overloaded, although it has the strongest signal strength to the mobile station.

While the following descriptions are applicable to 802.11 WLANs, it is understood that the invention applies to wireless networks in general using similar formats and mechanisms. Table 1 below shows the beacon frame body of a management frame of subtype Beacon with each of the listed components specified in the 802.11 standard.

TABLE 1

Beacon frame body

| Order | Information | Notes |
|---|---|---|
| 1 | Timestamp | Time/day/etc information |
| 2 | Beacon interval | Time between beacon intervals |
| 3 | Capability information | Resource parameters, polling parameters, etc. |
| 4 | SSID | Service Set ID (Wireless Network Name) |
| 5 | Supported rates | Data Rates supported by the system/device |
| 6 | FH Parameter Set | The FH Parameter Set information element is present within Beacon frames generated by STAs (Mobile STAtions) using frequency-hopping (FH) PHYs (PHYsical layer modulations) |
| 7 | DS Parameter Set | The DS Parameter Set information element is present within Beacon frames generated by STAs using direct sequence (DS) PHYs |
| 8 | CF Parameter Set | The CF (Contention Free) Parameter Set information element is only present within Beacon frames generated by APs (Access Points) supporting a PCF (Point Coordination Function) |
| 9 | IBSS Parameter Set | The IBSS (Independent Basic Service Set) Parameter Set information element is only present within Beacon frames generated by STAs in an IBSS |
| 10 | TIM | The TIM (Traffic Information Map) information element is only present within Beacon frames generated by APs |

Typically, the mobile station can operate in either Passive Scanning mode or Active Scanning mode. In Passive Scanning mode, the mobile station listens to each channel scanned for no longer than a maximum duration defined by the ChannelTime parameter. The Active Scanning mode involves the generation of a Probe Request frame by the mobile stations, which is shown in Table 2 below, and the subsequent processing of a received Probe Response frame, which is shown in Table 3, by the access point.

TABLE 2

Probe Request frame body

| Order | Information |
|---|---|
| 1 | SSID |
| 2 | Supported rates |

TABLE 3

Probe Response frame body

| Order | Information | Notes |
|---|---|---|
| 1 | Timestamp | Time/day/etc. information |
| 2 | Beacon interval | Time between beacon intervals |
| 3 | Capability information | Resource parameters, polling parameters, etc. |
| 4 | SSID | Service Set ID (Wireless Network Name) |
| 5 | Supported rates | Data Rates supported by the system/device |
| 6 | FH Parameter Set | The FH Parameter Set information element is present within Beacon frames generated by STAs using frequency-hopping PHYs |
| 7 | DS Parameter Set | The DS Parameter Set information element is present within Beacon frames generated by STAs using direct sequency PHYs |
| 8 | CF Parameter Set | The CF Parameter Set information element is only present within Beacon frames generated by APs supporting a PCF |
| 9 | IBSS Parameter Set | The IBSS Parameter Set information element is only present within Beacon frames generated by STAs in an IBSS |

After scanning the access point beacons, the mobile station adopts the BSSID (Basic Service Set ID: Access Point ID) and channel synchronization information in a Beacon (passive) or Probe Response (active) coming from the access point with the best signal strength. An Association/Reassociation Request is then issued by the mobile station as it attempts to associate with the selected access point. The access point then responds with an Association Response. The corresponding Association Request and Association Response frame formats are shown below in Table 4 and Table 5, respectively. It is understood that further actions, such as authentication, take place before or after the association phase.

TABLE 4

Association/Reassociation Request frame body

| Order | Information |
|---|---|
| 1 | Capability information |
| 2 | Listen interval |
| 3 | SSID |
| 4 | Supported rates |

TABLE 5

| Association Response frame body | |
|---|---|
| Order | Information |
| 1 | Capability information |
| 2 | Status code |
| 3 | Association ID (AID) |
| 4 | Supported rates |

Figure 2:
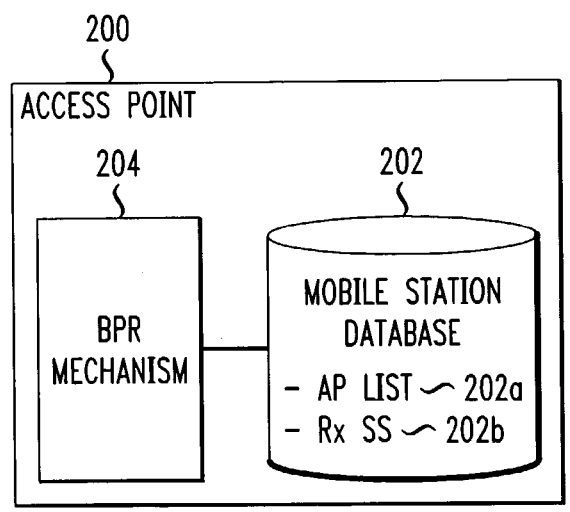
FIG. 2 is a schematic block diagram of an exemplary access point having beacon power adjustment in accordance with the present invention.

FIG. 2 shows an exemplary access point 200 having a mobile station database 202 and a mechanism 204 enabling beacon power reduction only if no mobile station will be left without service. It is understood that, under certain conditions, the beacon power can be reduced even if one or more mobile stations are left without service. The access point 200 receives information from the mobile stations associated with it, such as how many access points each associated mobile station can "hear."

Referring now to FIG. 1 in conjunction with FIG. 2, some mobile stations, such as MSc, will report that they can hear not only the currently associated access point APa, but also one or more additional access points APb. Other mobile stations, e.g., MSe, will report that they can only hear their current access point APa. This information can be stored in the database 202, which can store, for example, a list 202a of mobile stations and the access points that are available to each mobile station and a received signal strength 202b. For single access point mobile stations, e.g., MSe, the current access point APa measures the received signal strength. If the received signal strength of the mobile station MSe is high enough to indicate that beacon power reduction for the access point APa will not affect the MSe's ability to communicate with the current access point APa, the access point APa can reduce its beacon power.

As described above, due to access point, e.g., APa, beacon power reduction, some mobile stations, e.g., MSc, will no longer hear the current access point APa beacon as the strongest, and will associate with another access point, e.g., APb. This in turn reduces the load and traffic intensity over the current access point APa.

If the access point determines that its loading and traffic intensity is relatively low, it can bring its beacon power back to a predetermined value. In one embodiment, the beacon power has a maximum value to avoid hidden terminals from associating with the access point.

In an exemplary embodiment, frequency option information can be conveyed in the Association/Reassociation request frame, which is shown above in Table 4. These two management frames contain the same Capability Information field, which is used to indicate requested or advertised capabilities. In an illustrative embodiment, the length of the Capability Information field is 2 octets.

Figure 3:
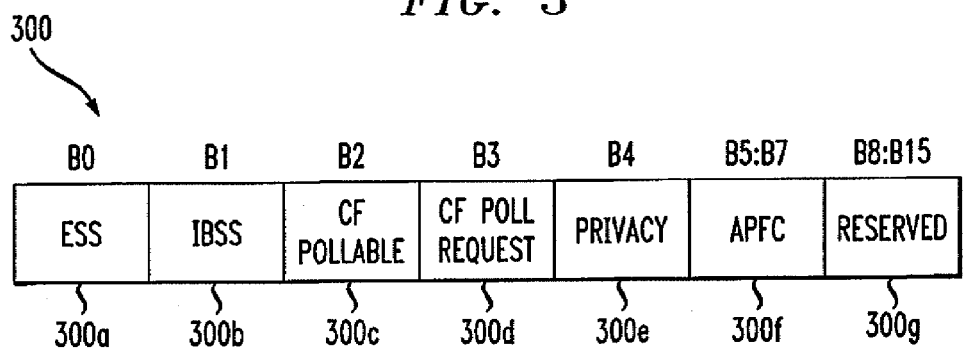
FIG. 3 is a pictorial representation of an exemplary capability field that can be contained in a message exchanged by an access point and a mobile station in accordance with the present invention.

FIG. 3 shows an exemplary Capability Information field 300 having sub fields of ESS 300a, IBSS 300b, CFPollable 302c, CFPoll Request 302d, and Privacy 302e, together using five of the sixteen total bits. In an exemplary embodiment, three bits form a further subfield APFC 300f are used to indicate the number of access points that a given mobile station can associate with other than the currently communicating access point. The remaining bits 300g of the Capability Information field 300 are reserved. Another embodiment can use one bit to indicate whether there is an alternative access point with sufficient signal strength available to the mobile station and use additional bits (e.g., two to three bits) to indicate the rough signal quality of the alternative access point(s). This information can be used later by the current access point to assess if the particular mobile is able to move to the alternative access point if its beacon power is reduced to a certain level.

Figure 4A:
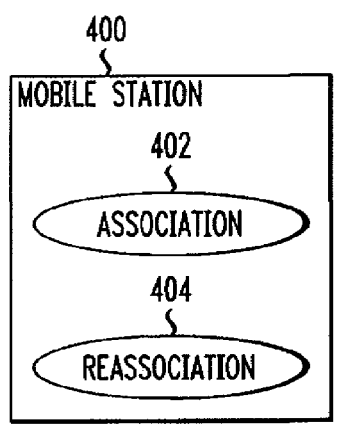
FIG. 4A is a schematic depiction of a mobile station for associating with an access point having beacon power adjustment in accordance with the present invention.
Figure 4B:
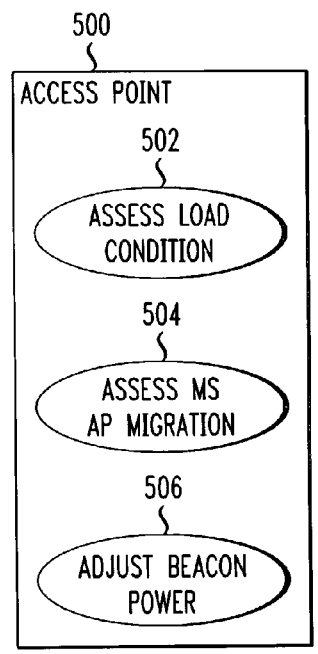
FIG. 4B is a schematic depiction of an access point having beacon power adjustment in accordance with the present invention.

FIGS. 4A, 4B show an exemplary mobile station 400 (FIG. 4A) that can communicate access point signal information to an exemplary access point 500 (FIG. 4B) in a network having load balancing with access point beacon power adjustment in accordance with the present invention. The mobile station 400 includes an association function 402 that indicates the number of access points which the mobile station can associate with as included in the Capability Information field in the Association/Reassociation request frame, thus conveying the information to the current access point. Later, this information can be kept updated via Reassociation requests by the mobile when there is a change, e.g., another access point is no longer available for the mobile station.

In one particular embodiment, the mobile station 400 scans the frequency channels to determine with which access points the mobile station can associate—that is, which access points provide a beacon signal above a predetermined threshold, for example. Similarly, the mobile station 400 can include a re-association function 404 that indicates the number of access points that the mobile station can potentially associate with as identified in the Capability Information field.

As shown in FIG. 4B, the access point 500 includes a first local function 502 to assess the medium load condition, e.g., determine the number of mobile stations associated with the access point, their bandwidth usage, transmission queue length, number of error packets compared to the total traffic, etc. The access point 500 further includes a second local function 504 to assess the likelihood that a currently associated mobile station can associate with a different access point. More particularly, the access point 500 evaluates whether the signal strength of a further access point to the mobile station is sufficient to enable migration to the further access point based upon information in the mobile station database 202 of FIG. 2, for example. A third local function 506 can adjust (up or down) the access point beacon power to a desired level or by a desired amount, e.g., a predetermined step size.

It will be readily appreciated by one of ordinary skill in the art that beacon power can be adjusted in a variety of ways including predetermined linear or non-linear step sizes as well as to predetermined levels. Further power adjustment variations will be readily apparent to one skilled in the art.

Figure 5:
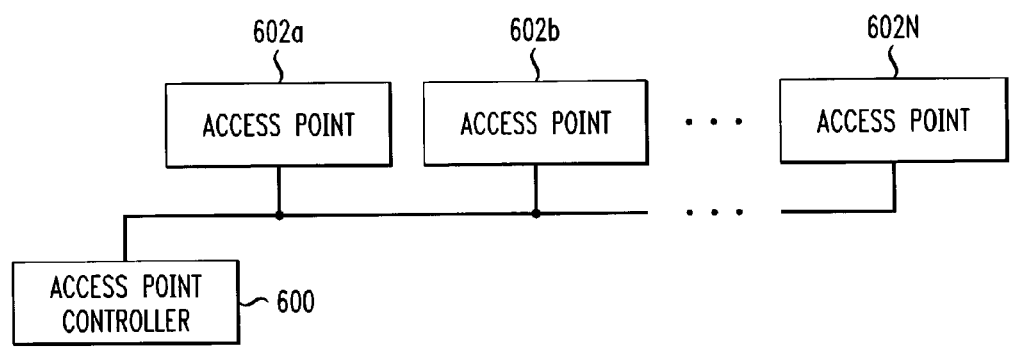
FIG. 5 is a schematic depiction of a network having an access point controller for controlling beacon power in network access points in accordance with the present invention.

In an alternative embodiment shown in FIG. 5, beacon power adjustments are controlled by a central access point beacon power controller 600 for the access points 602a-N in the network. The controller 600 receives association information from the access points 602 and evaluates the overall impact of beacon power adjustments to achieve optimal load balancing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of redistributing access point loading in a wireless network, comprising:

examining a load level for a first access point associated with a plurality of mobile stations;

receiving access point availability information from each one of the plurality of mobile stations associated with the first access point, wherein the access point availability information indicates how many access points are available to the each one of the plurality of mobile stations;

determining whether at least one of the plurality of mobile stations is able to associate with a second access point prior to adjusting a beacon power of the first access point; and adjusting the beacon power of the first access point to modify the load level of the first access point such that at least one of the plurality of mobile stations associates with the second access point.

2. The method according to claim 1, wherein the adjusting comprises adjusting the beacon power of the first access point by decreasing the beacon power.

3. The method according to claim 2, wherein the adjusting comprises decreasing the beacon power by a predetermined step size.

4. The method according to claim 2, wherein the adjusting comprises decreasing the beacon power to a first predetermined level.

5. The method according to claim 1, wherein the access point availability information includes one or more of access points that can be accessed by the each one of the plurality of mobile stations and signal strength information.

6. The method according to claim 1, further including storing the access point availability information.

7. The method according to claim 1, further including adjusting the beacon power of the first access point by increasing the beacon power.

8. The method according to claim 1, further including providing the wireless network as an 802.11 type network.

9. A network comprising:

a plurality of access points each having a respective coverage area for supporting a plurality of mobile stations, wherein access point availability information from each one of the plurality of mobile stations is received by a respective associated access point of the plurality of access points, wherein the access point availability information indicates how many access points are available to the each one of the plurality of mobile stations, and a first one of the plurality of access points adjusts a beacon signal power for re-distributing a load on the first one of the plurality of access points, wherein the first one of the plurality of access points includes a database for storing the access point availability information received from the each one of the plurality of mobile stations that is currently associated with the first one of the plurality of access points, wherein the first one of the plurality of access points further includes a mechanism for preventing beacon power adjustments that would leave any one of the plurality of mobile stations without a further one of the plurality of access points to associate with.

* * * * *